United States Patent
Namba et al.

(10) Patent No.: US 9,671,807 B2
(45) Date of Patent: Jun. 6, 2017

(54) POWER GRID STABILIZATION SYSTEM AND POWER GRID STABILIZATION METHOD

(75) Inventors: Shigeaki Namba, Tokyo (JP); Atsushi Honzawa, Tokyo (JP); Hiroto Takeuchi, Tokyo (JP); Kazuyuki Tsunoda, Tokyo (JP); Mika Imai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 528 days.

(21) Appl. No.: 14/370,071

(22) PCT Filed: Jan. 6, 2012

(86) PCT No.: PCT/JP2012/050151
§ 371 (c)(1),
(2), (4) Date: Jul. 1, 2014

(87) PCT Pub. No.: WO2013/103011
PCT Pub. Date: Jul. 11, 2013

(65) Prior Publication Data
US 2014/0365027 A1 Dec. 11, 2014

(51) Int. Cl.
*H02J 3/32* (2006.01)
*G05F 1/66* (2006.01)
*H02J 3/46* (2006.01)

(52) U.S. Cl.
CPC .............. *G05F 1/66* (2013.01); *H02J 3/32* (2013.01); *H02J 3/46* (2013.01)

(58) Field of Classification Search
None
See application file for complete search history.

(56) References Cited

U.S. PATENT DOCUMENTS

| 8,588,989 B1 * | 11/2013 | Heath ............... G06F 1/26 700/286 |
| 2003/0202344 A1 * | 10/2003 | Kenny ............... H02J 7/35 362/183 |

(Continued)

FOREIGN PATENT DOCUMENTS

| JP | 2004-129412 A | 4/2004 |
| JP | 2006-094648 A | 4/2006 |

(Continued)

OTHER PUBLICATIONS

Extended European Search Report received in corresponding European Application No. 128645652 dated Oct. 8, 2015.

*Primary Examiner* — Isaac T Tecklu
(74) *Attorney, Agent, or Firm* — Mattingly & Malur, PC

(57) ABSTRACT

Plural power storage systems 10 are provided in a power system. The power storage systems 10 are connected to a management system 60 via a communication network CN1. The power storage systems each include a power storage device 11, 12, and a control device 100 for controlling the power storage device. The control device stores performance information about the power storage system including the control device, location information indicating a location in the power system of the power storage system including the control device, and order information indicating an order of operation allocated to the power storage system including the control device. When a disturbance occurs in the power system, the control device performs a predetermined compensation operation based on the location information and the order information, and then returns to a preset stand-by state.

18 Claims, 14 Drawing Sheets

(56) References Cited

U.S. PATENT DOCUMENTS

| | | | |
|---|---|---|---|
| 2004/0232883 A1* | 11/2004 | Ochiai | B60L 11/1851 320/125 |
| 2006/0241876 A1* | 10/2006 | Ingram | H02J 7/0019 702/57 |
| 2010/0204859 A1* | 8/2010 | Kamaga | B60L 3/0046 701/22 |
| 2010/0308765 A1* | 12/2010 | Moore | H02J 7/0013 320/103 |
| 2010/0318234 A1* | 12/2010 | Moore | H02J 7/0013 700/293 |
| 2010/0332040 A1* | 12/2010 | Garcia | F03D 7/0284 700/287 |
| 2011/0140667 A1* | 6/2011 | Moon | H02J 3/32 320/134 |
| 2012/0074905 A1* | 3/2012 | Jeong | H02J 7/0016 320/116 |
| 2012/0098496 A1* | 4/2012 | Jeong | H01M 10/441 320/122 |
| 2012/0197452 A1* | 8/2012 | Matthews | H02J 3/008 700/292 |
| 2012/0239214 A1* | 9/2012 | Nakashima | H02J 3/32 700/291 |
| 2012/0249068 A1* | 10/2012 | Ishida | B60L 11/1816 320/109 |
| 2012/0306447 A1* | 12/2012 | Jeong | H02J 7/0016 320/116 |
| 2014/0070617 A1* | 3/2014 | Detmers | H02J 7/041 307/64 |
| 2014/0070756 A1* | 3/2014 | Kearns | H02J 7/007 320/101 |
| 2014/0214223 A1* | 7/2014 | Tsunoda | H02J 3/24 700/292 |
| 2014/0316601 A1* | 10/2014 | Markowz | H02J 3/32 700/297 |
| 2015/0001944 A1* | 1/2015 | Markowz | H02J 3/32 307/66 |
| 2015/0021998 A1* | 1/2015 | Trescases | H02J 5/00 307/46 |
| 2015/0349387 A1* | 12/2015 | Inaba | H01M 10/44 700/297 |
| 2016/0099568 A1* | 4/2016 | Gersch | H02J 3/32 307/20 |

FOREIGN PATENT DOCUMENTS

| | | |
|---|---|---|
| JP | 2007-135355 A | 5/2007 |
| JP | 2010-233287 A | 10/2010 |
| WO | 2008/073453 A1 | 6/2008 |
| WO | 2011/043967 A2 | 4/2011 |

\* cited by examiner

FIG.3

| | | | | | T10 | |
|---|---|---|---|---|---|---|
| UNIQUE IDENTIFICATION INFORAMTION ||||||||
| C100 | C101 | C102 | C103 | C104 | C105 | C106 |
| ID | PRODUCT S/N | MAX. STORAGE AMOUNT | CHARGE PERFORMANCE | DISCHARGE PERFORMANCE | SoC | CONDITION |
| V1 | Ser1 | Vmax1 | CP1 | DP1 | 50% | Good |

FIG. 4

BASIC SYSTEM INFORMATION T11

| # | C111 ID | C112 PRODUCT S/N + ADDITIONAL INFORMATION | C113 PRESENCE FLAG | C114 OPERABILITY FLAG | C115 TOPOLOGY CONFIRMATION FLAG | C116 GROUP # | C117 ORDER OF OPERATION | C118 SCHEDULE CONTROL |
|---|---|---|---|---|---|---|---|---|
| 1 | V1 | Ser1+Vmax1+SoC1 | 1 | 1 | 1 | G1 | 1 | Se1 |
| 2 | V2 | Ser2+Vmax2+SoC2 | 1 | 1 | 1 | G1 | 2 | Se2 |
| 3 | V3 | Ser3+Vmax3+SoC3 | 0 | - | - | G1 | - | - |
| 4 | V4 | Ser4+Vmax4+SoC4 | 1 | 1 | 1 | G1 | 3 | Se4 |
| 5 | V5 | Ser5+Vmax5+SoC5 | 1 | 1 | 1 | G2 | 1 | - |
| 6 | V6 | Ser6+Vmax6+SoC6 | 1 | 0 | - | G2 | 2 | - |
| 7 | V7 | Ser7+Vmax7+SoC7 | 1 | 1 | 1 | G2 | - | - |
| 8 | V8 | Ser8+Vmax8+SoC8 | 1 | 1 | 1 | G3 | 1 | Se8 |
| 9 | V9 | Ser9+Vmax9+SoC9 | 1 | 1 | 1 | G3 | 2 | Se9 |
| ⋮ | ⋮ | ⋮ | ⋮ | ⋮ | ⋮ | ⋮ | ⋮ | ⋮ |

FIG.5

| SCHEDULE CONTROL INFORMATION T12 | | | |
|---|---|---|---|
| C120 | C121 | C122 | C123 |
| Sc# | TARGET DEVICE | TIME AND DATE | OPERATION TYPE |
| Sc1 | LiC1 | 7:00 ON WEEKDAY | DISCHARGE |
| Sc1 | Pb1 | 7:10 ON WEEKDAY | DISCHARGE |
| Sc2 | LiC2 | 8:00 ON WEEKDAY | DISCHARGE |
| Sc2 | Pb2 | 8:05 ON WEEKDAY | DISCHARGE |
| ... | ... | ... | ... |

POWER GRID STABILIZATION SYSTEM AND POWER GRID STABILIZATION METHOD

TECHNICAL FIELD

The present invention relates to a power system stabilization system and a power system stabilization method.

BACKGROUND ART

Recently, the use of renewable energies is being expanded from the viewpoint of securing energy security and reducing the burden on the global environment. Among the dispersed power sources making use of renewable energies, solar photovoltaic generation (may hereinafter be referred to as "PV") and wind-power generation are known.

The typical renewable energies mentioned above are dispersed power sources, and they are generally unstable in output compared with conventional thermal power generation or hydraulic power generation. Therefore, in cases where dispersed power sources are connected to a power system, a technical measure for dealing with sharp output variations is required.

In Patent Literature 1, a configuration in which the output variations of dispersed power sources are suppressed using NAS (sodium-sulfur) batteries and capacitors is partly disclosed (Patent Literature 1).

In Patent Literature 2, a configuration is disclosed in which a secondary battery for peak power smoothing is connected with a capacitor in parallel for complementing between charging and discharging of the secondary battery (Patent Literature 2).

CITATION LIST

Patent Literature

Patent Literature 1: Japanese Unexamined Patent Application Publication No. 2007-135355
Patent Literature 2: Japanese Unexamined Patent Application Publication No. 2004-129412

SUMMARY OF INVENTION

Technical Problem

According to the existing techniques, no concrete measure is proposed to deal with variations in the power system connected with dispersed small-capacity power sources. When secondary batteries or capacitors connected to the power system operate respectively independently, it may not be possible to suppress variations in the power system, whereas it is feared that charging and discharging are uselessly repeated to exhaust the secondary batteries.

An object of the present invention is to provide a power system stabilization system and a power system stabilization method for appropriately suppressing disturbances occurring in a power system by using plural power storage systems.

Solution to Problem

To solve the above problem, the power system stabilization system of the present invention that is a system for stabilizing a power system includes a plurality of power storage systems provided in a power system and a management system connected, via a communication network, to the plurality of power storage systems. In the power system stabilization system: the plurality of power storage systems each include a power storage device and a control device for controlling the power storage device; the control device includes a storage unit for storing performance information about the power storage system including the control device, location information indicating a location in the power system of the power storage system including the control device, and order information indicating an order of operation allocated, for each disturbance location, to the power storage system including the control device, and a compensation operation control unit which performs, when a disturbance occurs in the power system, a predetermined compensation operation based on the location information and the order information.

The plurality of power storage systems may be grouped beforehand according to predetermined districts set for the power system. The storage units of those power storage systems, among the plurality of power storage systems, belonging to a same group share the location information and the order information. The compensation operation control units of the power storage systems belonging to a same group each perform the predetermined compensation operation according to the order of operation indicated by the order information. When a disturbance occurs, each of the compensation operation control units may obtain, from the management system, information indicating whether or not the order of operation specified in the order information has arrived and, when the order of operation is determined to have arrived, may perform the predetermined compensation operation.

At least a part of the present invention can be realized as a computer program or a hardware circuit. The computer program can be distributed using a communication medium like the Internet or using a recording medium such as a hard disk or a flash memory device.

BRIEF DESCRIPTION OF DRAWINGS

FIG. 3 shows an example of composition of unique identification information stored in a power storage system.

FIG. 4 shows an example of composition of basic system information stored in a power storage system.

FIG. 5 shows an example of composition of schedule control information stored in a power storage system.

DESCRIPTION OF EMBODIMENTS

In the following, embodiments of the present invention will be described based on drawings. In the embodiments, as being described in detail below, plural power storage systems distributed in power system share location information indicating their locations in the power system and order information indicating an order in which they operate. In this way, according to the embodiments, the plural power storage systems can collaboratively perform compensation operations in the order specified by the order information.

Each of the plural power storage systems has identification information indicating its order number in the power storage system. For each location where a disturbance may occur in the power system, the order of operation of each power storage system is preset. The order of operations is determined such that the power storage systems closer to the location of a disturbance operate earlier. The power storage systems farther from the location of a disturbance are lower in the order of operations. Note that the closeness to or farness from a disturbance location is determined based on the routing of power lines.

First Embodiment

Figure 1:
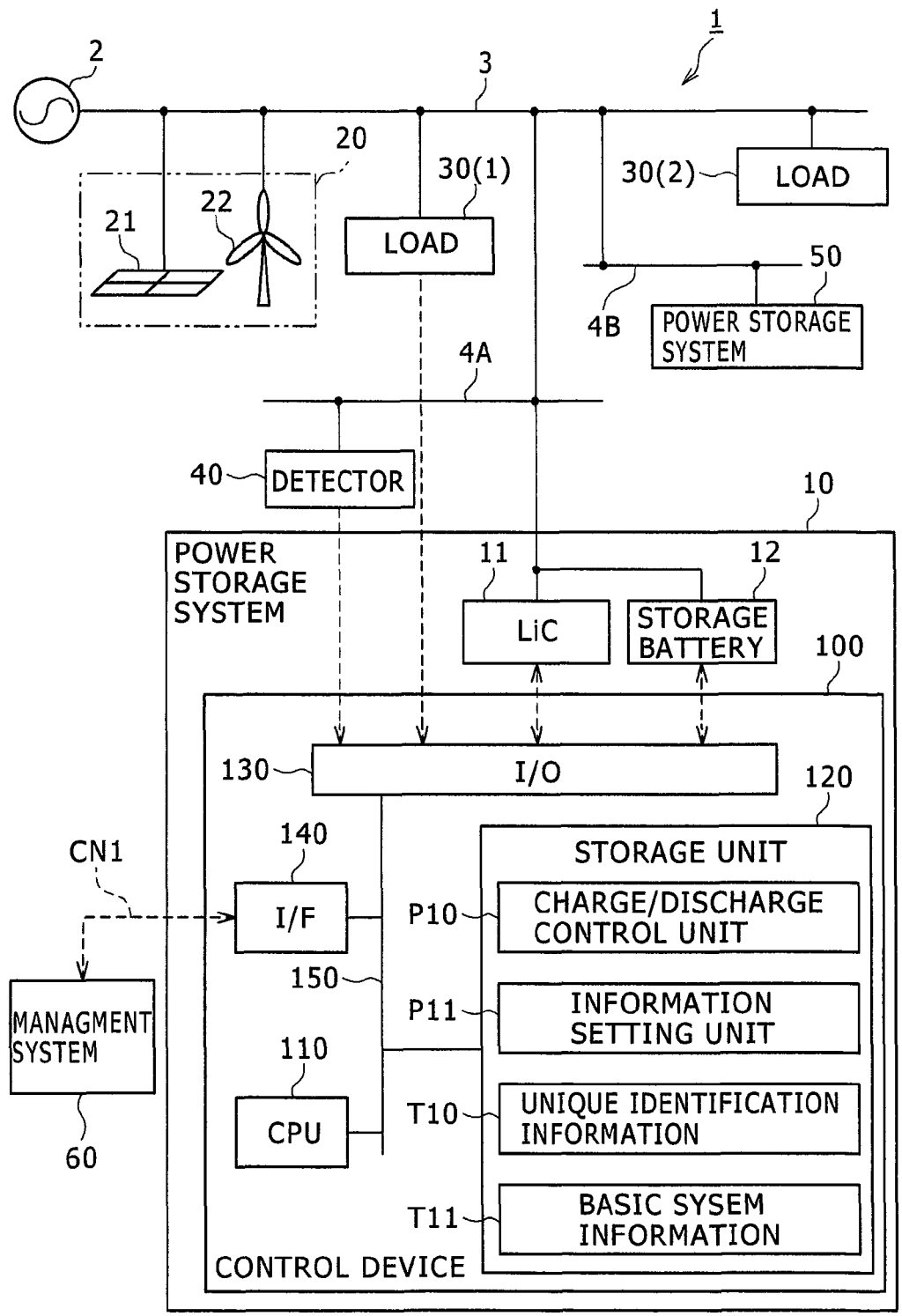
FIG. 1 shows a power system configuration including a power system stabilization system.

FIG. 1 shows a power system configuration including a power system stabilization system 1 according to a first embodiment of the present invention. For example, a substation 2 which transforms the power received from a large-scale centralized power station into a predetermined voltage and distributes the transformed power is connected with a transmission line 3 from which plural distribution lines 4A and 4B are branched. When not particularly distinguished, the distribution lines 4A and 4B will be each referred to as a "distribution line 4."

The transmission line 3 or distribution lines 4 are connected with power storage systems 10 and 50. The power storage system 10 is an object of control in the present embodiment. The other power storage system 50 is not an object of control in the present embodiment. It is shown for comparison purposes. The configuration of the power storage system 10 will be described later.

A dispersed power source 20 is connected to the transmission line 3 or distribution line 4. The dispersed power source 20 includes, for example, a solar photovoltaic system 21 or a wind power station 22. The dispersed power source 20 is not limited to a solar photovoltaic system or a wind power station. It may be, for example, a solar thermal power system.

Loads 30(1) and 30(2) are various electrical loads held by users. The load 30(1) is, for example, a load of a relatively large capacity such as a large electric motor. The power storage system 10 can recognize starting and stopping of the large-scale load 30(1). The load 30(1) to be monitored by the power storage system 10 is not limited to one. The power storage system 10 can remotely monitor startings and stoppings of plural loads 30(1).

The other load 30(2) is, for example, a general household electrical product, an air conditioner for building, an illumination device, or a passenger conveyor. When not particularly distinguished, the loads 30(1) and 30(2) will be each referred to as a "load 30."

A detector 40 detects condition process quantities of the power system and transmits detected signals to the power storage system 10. The condition process quantities of the power system include frequencies, phases and voltages. The detector 40 may be configured like, for example, an instrument voltage transformer (VT) or an instrument current transformer (CT). Even though only one detector 40 is shown in the figure, plural detectors 40 may be connected to the power storage system 10. Note that, even though the power system includes plural switches and voltage regulators, their illustrations are omitted in describing the present embodiment.

The configuration of the power storage system 10 will be described. As being described later with reference to FIG. 2, plural power storage systems 10 are connected to the power system. Each power storage system 10 includes, for example, a power storage device (11, 12) and a control device 100. The power storage system 10 is bidirectionally communicatably connected to a management system 60 via a communication network CN1.

The power storage device (11, 12) includes, for example, a capacitor 11 and a storage battery 12. The capacitor 11 may be configured like, for example, a lithium ion capacitor. It may also be configured like an alternative type of capacitor such as an electric double layer capacitor. The capacitor 11 is higher in responsiveness than the storage battery and can instantaneously charge or discharge large power.

The storage battery 12 is configured like, for example, a lead storage battery, a lithium ion secondary battery, a nickel-hydrogen secondary battery, or a sodium-sulfur secondary battery (NAS battery: registered trademark). Generally, the storage battery 12 is low in responsiveness compared with the capacitor 11, but it can charge and discharge power over a relatively long period of time. Namely, the storage battery 12 can be configured to be larger in a total chargeable/dischargeable amount of energy than the capacitor 11. In the following, the power storage device (11, 12) will also be referred to simply as a power storage device without any reference numeral.

In the present embodiment, the power storage device includes the capacitor 11 and the storage battery 12 that, as described above, differ from each other in charging/discharging characteristics. The control device 100 uses either the capacitor 11 or the storage battery 12 depending on the compensation operation to be performed. For example, the control device 100 has the capacitor 11 perform charging/discharging to deal with sharply varying transient responses or has the storage battery 12 perform charging/discharging to deal with prolonged variations. The charge/discharge performance of the capacitor 11 and the storage battery 12 does not particularly matter.

The control device 100 is a device for, when a disturbance occurs in the power system, causing a predetermined compensation operation to be performed to suppress the disturbance and stabilize the power system. The control device 100 includes, for example, a microprocessor (shown as "CPU" (Central processing Unit) in the figure) 110, a storage unit 120, an input/output unit (shown as "I/O" in the figure) 130, and a communication interface unit (shown as "I/F" in the figure 140. These circuits 110 to 140 are connected to a bus 150.

The storage unit 120 may be configured to include, for example, a ROM (Read Only Memory), a RAM (Random Access Memory), a hard disk device, and a flash memory device. The storage unit 120 stores, in addition to a basic program such as an operating system (not shown), computer programs for realizing a charge/discharge control unit P10 and an information setting unit P20. The microprocessor 110 realizes the functions being described later by executing computer programs read from the storage unit 120.

The storage unit 120 stores, for example, unique identification information T10 and basic system information. T11. Also, the storage unit 120 can store topology information being described later with reference to FIG. 4. Furthermore, the storage unit 120 can also store schedule control information T12 being described later with reference to FIG. 5.

The input/output unit 130 is a circuit for exchanging signals with, for example, the power storage device (11, 12), the detector 40, and the specific load 30(1). The communication interface unit 140 is a circuit for communicating with the management system 60 via the communication network CN1.

The management system 60 manages compensation operations of plural power storage systems 10. The management system 60 holds the basic system information T11. The management system 60 may be configured, for example, as a part of a power feed instruction center. The power feed instruction center is a control system managed by a business operator managing the power system. The management system 60 may be configured as a system different from the power feed instruction center or may be configured in one of the plural power storage systems 10 so as to provide the power storage system 10 with the function of the management system 60. Furthermore, the management system 60 may be configured with one computer or may be configured by having plural computers operate in collaboration.

Figure 2:
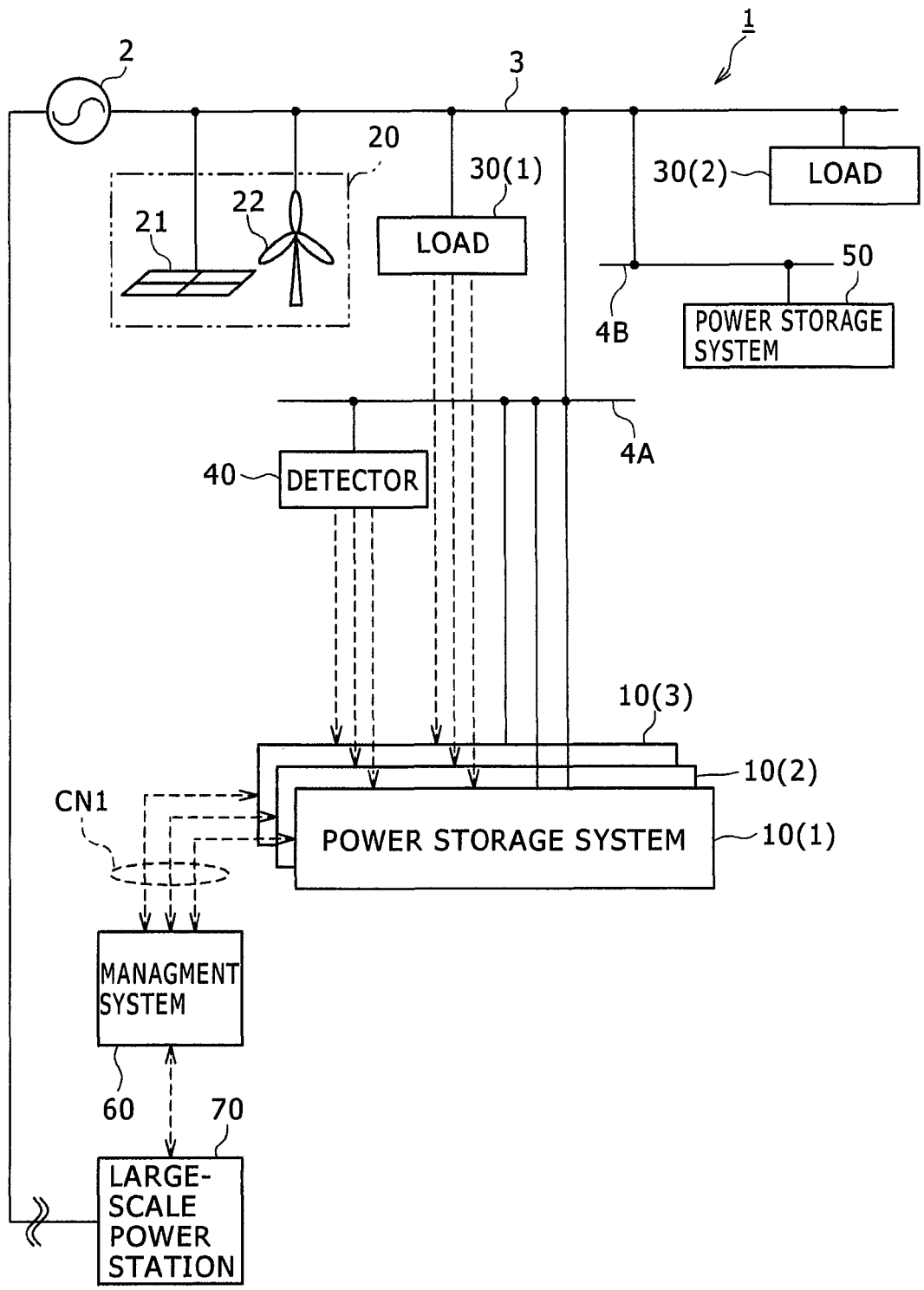
FIG. 2 is a power system configuration diagram illustrating a manner in which a management system manages plural power storage systems distributed in a power system.

FIG. 2 shows connections for communication between the management system 60 and plural power storage systems 10(1), 10(2), and 10(3). When not particularly distinguished, the power storage systems 10(1) to 10(3) will be each referred to as a "power storage system 10."

Each power storage system 10 is connected to the management system 60 via the communication network CN1. Each power storage system 10 is also connected to the detector 40. Furthermore, each power storage system 10 is also connected to the load 30(1) that is an object of monitoring.

The management system 60 can also communicate with a large-scale power station (centralized power station), for example, a thermal power station. The management system 60 can control, in collaboration with the operation of the large-scale power station 70, the compensation operation performed by each power storage system 10.

FIG. 3 shows an example of composition of the unique identification information T10. The unique identification information T10 is information for identifying an individual power storage system 10 and includes performance information about a power storage device. The unique identification information T10 associatively manages, for example, a system identifier C100, a product serial number C101, a maximum storage amount C102, charge performance C103, discharge performance C104, a remaining power amount (SoC: State of Charge) C105, and condition C106.

The system identifier C100 is for identifying a power storage system 10 managed by the management system 60. The system identifier C100 can be made corresponding to the location where a power storage system 10 is installed.

When the system identifier is known, where in the power system the power storage system 10 is located can be known. The product serial number C101 indicates the product serial number of the power storage system 10.

The maximum storage amount C102 indicates the maximum amount of power that can be stored in the power storage device. The charge performance C103 indicates the charge performance of the power storage device. The discharge performance C104 indicates the discharge performance of the power storage device. The remaining power amount C105 indicates the amount of power remaining in the power storage device. This is indicated without distinguishing the capacitor 11 and the storage battery 12. In reality, the performance of each of the capacitor 11 and the storage battery 12 is managed separately.

The condition C106 indicates the condition of the power storage system 10. The condition may be normal, faulty, or stopped. Information not indicated in FIG. 3, for example, a producer name, a production date, and version information can also be managed in the unique identification information T10.

FIG. 4 shows an example of composition of the basic system information T11. The basic system information T11 manages, regarding the power storage systems 10 in the power system, their locations, their conditions, the groups they belong to, their orders of operations, and their schedules.

The basic system information T11 includes, for example, management numbers C110, system identifiers C111, product serial numbers and additional information C112, presence flags C113, operability flags C114, topology confirmation flags C115, group numbers C116, orders of operations C117, and schedule control C118.

The management numbers C110 are consecutive row numbers. The system identifiers C111 identify the power storage systems 10, respectively. They include the identifier C100 described with reference to FIG. 3. The product serial numbers and additional information C112 include, the product serial number and information about the charge/discharge performance of each power storage system 10.

The presence flags C113 indicate whether or not the power storage systems 10 are currently present, respectively. For each power storage system 10, this flag is set to "1" when the system is present or set to "0" when the system is not present. For example, when a power storage system 10 is removed, the corresponding presence flag is set to "0."

The operability flags C114 indicate whether or not the power storage systems 10 are currently operable, respectively. For each power storage system 10, this flag is set to "1" when the system is operable or set to "0" when the system is not operable. When a power storage system 10 is operable, it is ready to perform a predetermined compensation operation normally. For example, when a power storage system 10 is deactivated for repair or inspection, the corresponding operability flag C114 is set to "0." For example, when a power storage system 10 develops a fault, the operability flag C114 for the system is set to "0."

The topology confirmation flags C115 indicate whether or not the power storage systems 10 have confirmed and stored topology information on the power system configuration in their storage units 120. The topology information is equivalent to the "location information." It indicates to which parts of which distribution lines each power storage system 10 and the load 30 are connected.

When the latest topology information is stored in the storage unit 120 of a power storage system 10, the topology confirmation flag C115 for the system is set to "1." When the latest topology information is not stored in the storage unit 120 of a power storage system 10, the topology confirmation flag C115 for the system is set to "0."

The group numbers C116 identify the groups to which the power storage systems 10 belong, respectively. Each group represents a district predetermined in connection with the power system. For example, plural groups can be set by dividing a geographical area associated with the power system into plural districts according to electrical characteristics, for example, "a northern redevelopment district," "an eastern residential district," and "a western industrial district." For example, in setting groups, a geographical area can be divided according to locations where transformers, substations, switches, circuit breakers, etc. are installed.

The orders of operations C117 indicate the orders of compensation operations to be performed by the respective power storage systems 10. The orders of operations C117 included in the basic system information T11 are equivalent to the "order information." In the following example, the highest order is represented by order no. "1" and larger order numbers represent lower orders of operations.

The power storage system 10 allocated with the highest order of operation can immediately start a predetermined compensation operation when a disturbance occurs in the group to which it belongs without waiting for any instruction or notification from the management system 60. Each of the remaining power storage systems 10 starts a predetermined compensation operation only after all other power storage systems allocated with smaller order numbers than the order number allocated to itself started compensation operations.

A disturbance as referred to in the present specification represents a state in which a voltage, frequency or phase variation has exceeded a predetermined threshold. Namely, when a pre-specified condition process quantity exits a specified tolerable range, it is determined that a disturbance has occurred.

A predetermined compensation operation is an operation to be performed to suppress a disturbance and stabilize the power system. When the power system voltage drops below a lower limit voltage value, the relevant power storage system 10 supplies, as a responsive compensation operation, reactive power from the power storage device to the power system. When the power system voltage rises above an upper limit voltage value, the power storage system 10 operates contrarily to the above as compensation operation.

When the power system frequency drops below a lower limit frequency value, the relevant power storage system 10 supplies, in a responsive compensation operation, active power from the power storage device to the power system. When the power system frequency rises above an upper limit frequency value, the relevant power storage system 10 operates contrarily to the above as compensation operation.

The schedule control C118 is information for identifying the schedule control information T12 set in each power storage system 10.

With reference to FIG. 5, an example of composition of the schedule control information T12 will be described. The schedule control information T12 associatively manages, for example, management numbers C120, target device numbers C121, time and date information C122, and operation types C123.

The management numbers C120 are consecutive numbers for managing individual schedules. The target devices C121 provide information for identifying the power storage element (either the capacitor 11 or the storage battery 12) to operate according to each schedule. The time and date information C122 indicates the time and date when each power storage element is to operate. The operation types C123 indicate the type of operation (either discharging or charging) to be performed by each power storage element.

For example, in a case where, in a residential district, it is known in advance that, on every weekday, they start preparations for cooking rice in a specific time period (e.g., around 7 p.m.) and put their rice cookers or microwave ovens in operation, schedule control for suppressing associated load variations is planned. Schedule control for suppressing load variations caused by rice cooking is set in each power storage system belonging to the group associated with the residential district. For example, according to the schedule control, the quick-responding capacitor 11 may be made to discharge first to be then followed by the storage battery 12. In this way, such periodic load variations occurring in the residential district can be prevented.

Another example will be described. For example, in a case where, in an industrial district, it is known in advance that, on every working day, large electric motors or electric welders are started in a specific time period, schedule control for suppressing associated load variations is planned. In each power storage system 10 belonging to the group associated with the industrial district, schedule control for suppressing load variations caused by startings and stoppings of electrical devices (production equipment, etc.) at factories is set. For example, according to the schedule control, the quick-responding capacitor 11 may be made to discharge first to be then followed by the storage battery 12. In this way, such periodic load variations occurring in the industrial district can be prevented.

As described above, in the present embodiment, an area receiving electric power from a power system to be an object of stabilization is divided into plural districts according to electrical characteristics (e.g., according to whether districts require power supply for general households or require high-voltage power supply for industrial use), and a group is set for each district. The power storage systems 10 located in each district are made to belong to the group associated with the district.

Since each group corresponds to a district determined as a result of dividing an area receiving electric power from a power system to be an object of stabilization, periodical load variations related with the electrical characteristics of the district can occur in the group. For example, in a district in which there are many general households, power consumption characteristically increases during evening hours when they cook rice and take a bath, whereas power consumption is relatively small during daytime hours. In a district in which there are many factories, power consumption characteristically varies based on factory work hours.

In the present embodiment, schedule control planned based on the characteristics of each district associated with each group is set beforehand in each power storage system 10 belonging to the group. It is, therefore, possible to prevent, in the district associated with each group, periodic load variations and keep the power system stable. Furthermore, in the present embodiment, the order of operation is set beforehand for each power storage system 10 belonging to each group as being described later, and the power storage system 10 allocated with order-of-operation no. 1 can start compensation operation immediately. Therefore, even when an abrupt load variation (disturbance) occurs in a district associated with a group, the load variation caused by the irregularity can be quickly suppressed to stabilize the power system.

Figure 6:
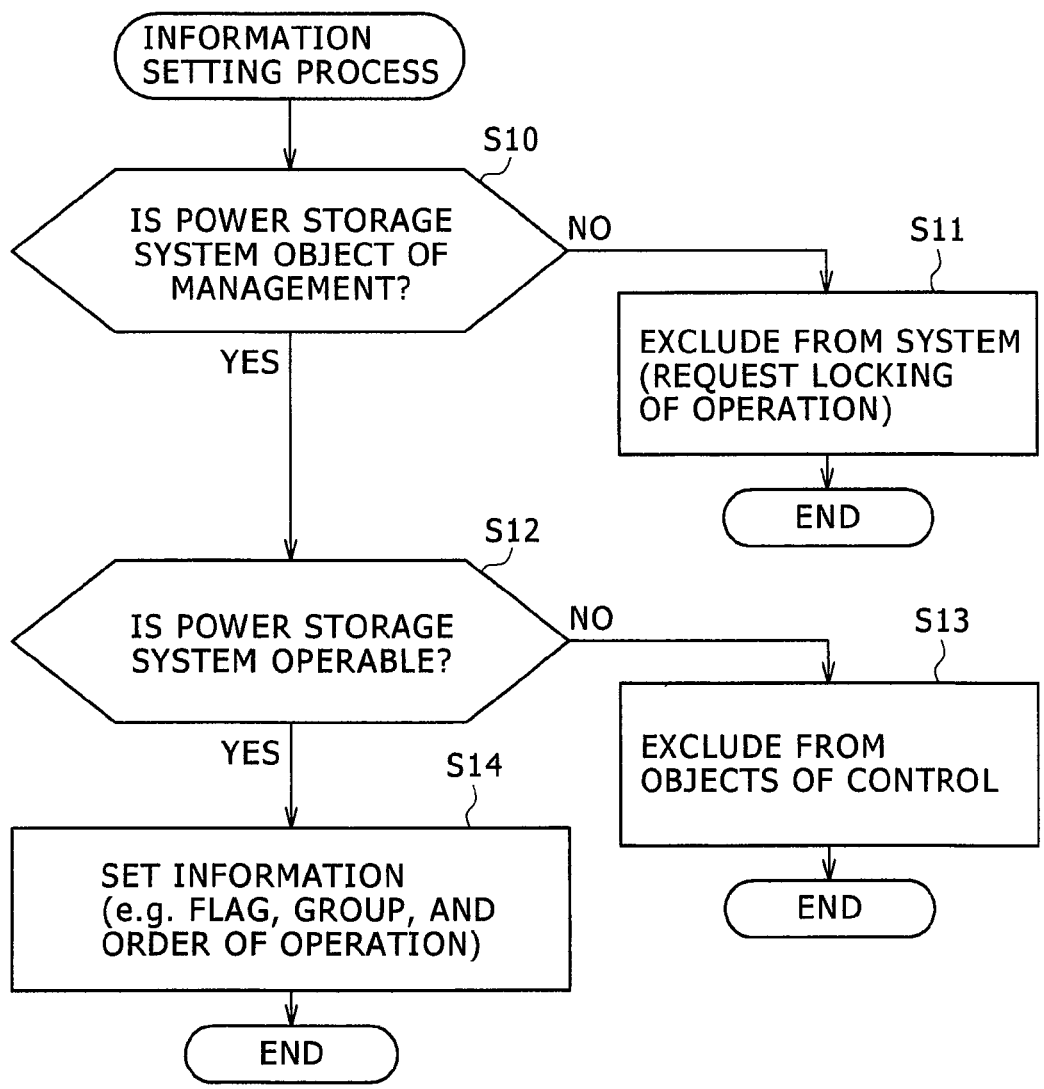
FIG. 6 is a flowchart for setting information in a power storage system.

FIG. 6 is a flowchart of processing performed by the management system 60 to set predetermined information in each power storage system 10.

The manager of the power system stabilization system (e.g., the manager of the power system) can enter predetermined information in each power storage system 10 via the management system 60. A case of entering information in a power storage system 10 will be described below. Information can be entered in plural power storage systems 10 by repeating the processing shown in FIG. 6.

The management system 60 determines whether the target power storage system for information setting is a power storage system 10 to be managed by the management system 60 (S10). This is because the power system possibly includes power storage systems 50 not to be managed by the management system 60.

When the target power storage system is a power storage system 50 not to be managed by the management system 60 (S10: NO), the management system 60 excludes the power storage system 50 from the power system stabilization system (S11). Excluding the power storage system 50 from the power system stabilization system is prohibiting, when a disturbance occurs in the power system, the power storage system 50 not to be managed by the management system 60 from performing discharging operation responding to the disturbance. For example, the management system 60 requests, using communication means such as an electronic mail, the personnel in charge of managing the power storage system 50 not to allow the power storage system 50 to perform charging/discharging operation responding to occurrence of a disturbance.

When the target power storage system is a power storage system 10 to be managed by the management system 60 (S10: YES), the management system 60 determines whether the power storage system 10 is operable (S12). Namely, the management system 60 determines whether the power storage system 10 is in a normal operable state and also whether the remaining power amount (SoC) of the power storage system 10 is enough for performing compensation operation.

If the power storage system 10 is not in a normal operable state, or if its remaining power amount is inadequate, the management system 60 determines that the power storage system 60 is inoperable (S12: NO).

The management system 60 excludes the power storage system 10 determined to be inoperable from the power system stabilization system (S13). The power storage system 10 excluded from the power system stabilization system does not execute, when a disturbance occurs, compensation operation. In this case, the management system 60 sets, for the power storage system to be excluded, the operability flag C114 included in the basic system information T11 to "0." In the group to which the excluded power storage system belongs, only the remaining operable power storage systems are to deal with occurrence of a disturbance in the power system.

When the target power storage system 10 for information setting is operable (S12: YES), the management system 60 sets the basic system information T11 and schedule control information T12 in the storage unit 120 of the power storage system 10(S14).

The management system 60 may set the basic system information T11 and other information in plural power storage systems 10 either approximately simultaneously or sequentially.

A case of removing an existing power storage system 10 will be discussed below.

In cases where there is a backup power storage system 10 located near the power storage system 10 to be removed, the management system 60 sets the same information as the basic system information T11 and other information set in the power storage system 10 to be removed in the backup power storage system 10 before the backup power storage system 10 is put in operation.

Figure 7:
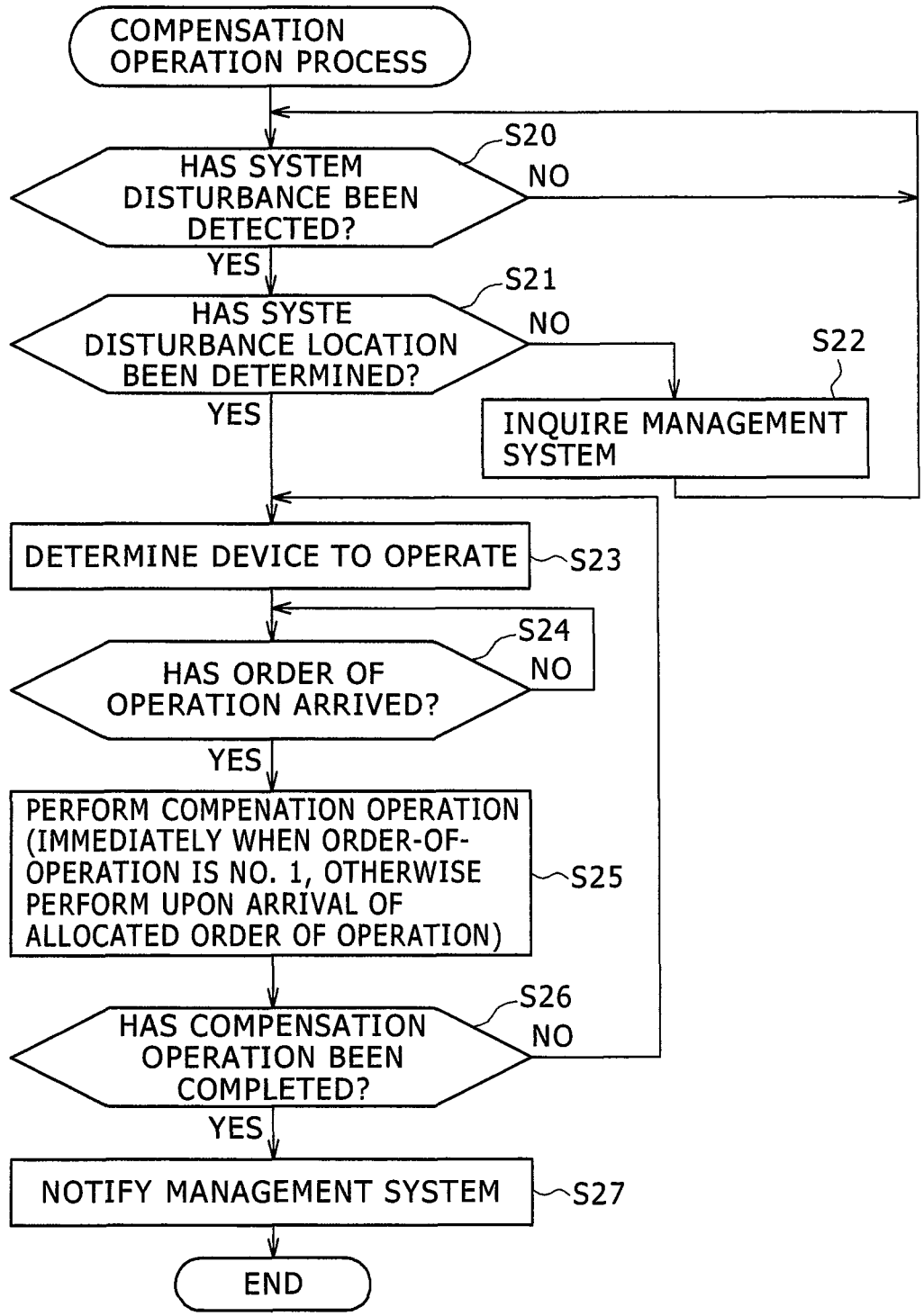
FIG. 7 is a flowchart for compensation operation performed by a power storage system.

FIG. 7 is a flowchart for compensation operation processing performed in a power storage system 10. The power storage system 10 keeps monitoring whether a disturbance has occurred in the power system based on a detection signal from the detector 40 (S20). In the description of the following steps, a system disturbance will be referred to simply as a "disturbance."

When a disturbance is detected (S20: YES), the power storage system 10 determines whether the location of the disturbance has been determined by analyzing a detection signal from the detector 40 (S21). When the disturbance location has not been determined (S21: NO), the power storage system gives an inquiry to the management system 60 regarding information about disturbance occurrence (S22). In cases where a disturbance to be quickly responded to occurs, an inquiry may be sent upon detection of the disturbance (S20: YES) to the management system 60 regarding information about disturbance occurrence (S22).

When the disturbance location has been determined (S21: YES), the power storage system 10 determines a device (capacitor 11 or storage battery 12) to perform compensation operation (S22). For example, when the disturbance requires to be quickly responded to, the quick-responding capacitor 11 is selected.

The power storage system 10 refers to the order of operation C117 included in the basic system information T11 and confirms the order of operation allocated thereto (S24). When the power storage system 10 determines that the order of operation allocated thereto has arrived (S24: YES), the power storage system 10 starts a predetermined compensation operation (S25).

When the order of operation allocated to the power storage system 10 is no. 1, the power storage system 10 is the first power storage system to respond to occurrence of a disturbance in the district associated with the group. When a disturbance occurs, the power storage system 10 allocated with order-of-operation no. 1 starts compensation operation immediately without waiting for a notification from the management system 60 so as to suppress or mitigate the disturbance.

When the order of operation allocated to the power storage system 10 is other than no. 1, the power storage system 10 waits for a notification from the management system 60 and starts compensation operation only after confirming that the order of operation allocated thereto has arrived. For example, a power storage system 10 allocated with order-of-operation no. 3 starts compensation operation after the power storage systems allocated with order-of-operation no. 1 and no. 2, respectively, started compensation operations.

The power storage system 10 determines whether the compensation operation has been completed (S26). When the disturbance has been removed by the charging/discharging operation of the first-selected device only (e.g., by the capacitor 11) (S26: YES), the power storage system 10 notifies the management system 60 accordingly (S27).

When the disturbance has not been removed by the first selected device alone (S26: NO), processing returns to S23 to select a next device to perform charging/discharging (e.g., the storage battery 12). The power storage system 60 starts compensation operation using the newly selected device (S25).

When, as a result of the power storage system 10 having operated all operable devices (power storage devices), the disturbance has been removed, the power storage system 10 determines that the compensation operation has been completed (S26: YES) and notifies the management system 60 of the completion of the compensation operation (S27).

Note that, only after making a device (e.g., the capacitor 11) perform charging/discharging operation and confirming the disturbance suppressing effect of the charging/discharging operation, the power storage system 10 can make a next device (e.g., the storage battery 12) perform charging/discharging operation (S25, S26).

This is because there are cases in which a large time constant is involved depending on the power system configuration and the location of occurrence of a disturbance and it takes time before a disturbance is suppressed by charging/discharging operation. In such cases, if charging/discharging operation by a device is immediately followed by charging/discharging operation by another device, hunting may occur. To prevent such a situation, a configuration may be used in which a waiting time unique to the power system is set as a time for confirming the effect of compensation by charging/discharging operation and in which a next device is made to perform charging/discharging after elapsing of the waiting time unique to the power system.

Alternatively, after charging/discharging by a device ends, a mode may be entered in which charging/discharging operation is prohibited until elapsing of a predetermined time.

A case in which plural devices (the capacitor 11 and the storage battery 12) are switchingly used in a single power storage system 10 has been described, but the embodiment can also be applied to a case in which compensation operation is switched between plural power storage systems.

For example, when compensation operation has been performed by a power storage system 10, compensation operation by another power storage system 10 can be started after elapsing of a predetermined amount of time. The timing of starting compensation operation by the power storage systems 10 allocated with order-of-operation no. 2 or lower is adjusted by the management system 60.

The order of operation to be allocated to and the type of compensation operation to be performed by each power storage system 10 can be determined by a prior simulation. For example, the management system 60 assumes various types of disturbances and determines, for each disturbance, all patterns of compensation operation to be performed by power storage systems 10 located near the location of the disturbance. The management system 60 forecasts the effect of compensation operation of each of the determined patterns and sets the order of operation to be allocated to and the type of compensation operation to be performed by each power storage system 10 in the basic system information T11.

The basic system information T11 shown in FIG. 4 shows only one order of operation for each power storage system. In reality, plural orders of operation may be set for each power storage system corresponding to plural disturbances. For example, a power storage system 10 may be allocated with order-of-operation no. 1 for one disturbance and with order-of-operation no. 3 for another disturbance.

The management system 60 can appropriately update the basic system information T11 by conducting simulations periodically or irregularly. The latest basic system information T11 updated in the management system 60 is preferably set approximately simultaneously in all power storage systems 10 managed by the management system 60. In cases where all the power storage systems 10 cannot be updated approximately simultaneously, the management system 60 may first update the basic system information T11 in such power storage systems 10 which allow updating of the basic system information T11.

Figure 8:
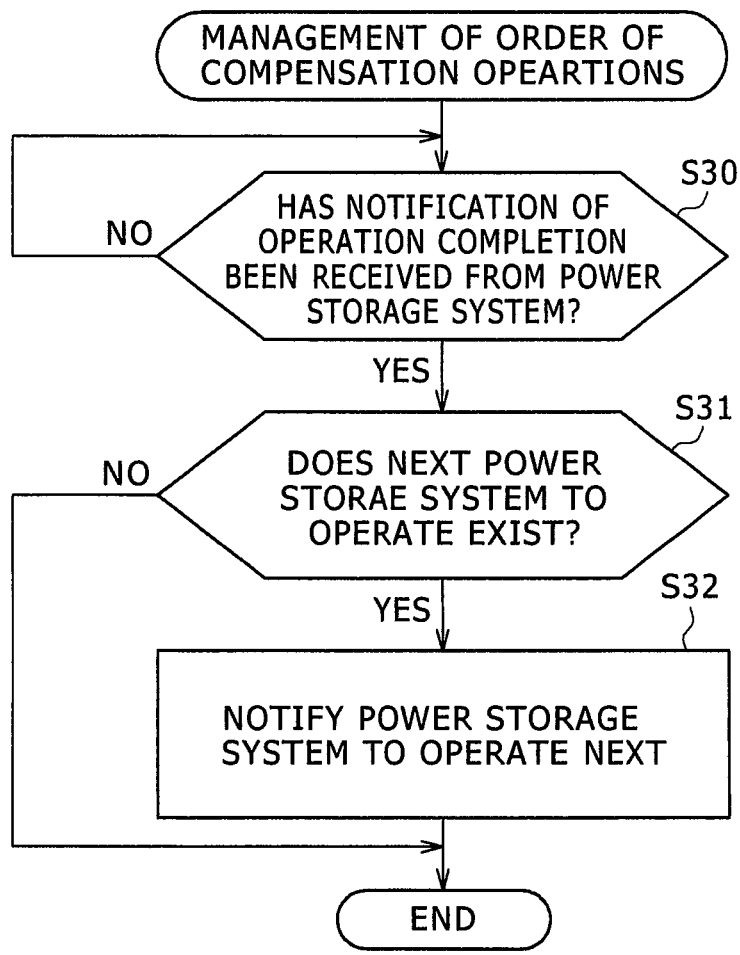
FIG. 8 is a flowchart for processing performed by a management system to manage an order of compensation operations.

FIG. 8 is a flowchart for management by the management system 60 of the order of compensation operations. The management system 60 is notified of completion of compensation operation from a power storage system 10(S30: YES).

The management system 60 determines, by referring to the basic system information T11, whether a power storage system 10 to operate next exists (S31). When a power storage system 10 to operate next exists (S31: YES), the management system 60 notifies the power storage system 10 that compensation operation can be started (S32).

When no power storage system 10 to operate next exists (S31: NO), the management system 60 ends the processing. When the disturbance is not suppressed even after all operable power storage systems 10 in the group were operated, the management system 60 may select one or more power storage systems 10 belonging to a different group and have them start compensation operation.

When the disturbance is not suppressed even after the power storage systems belonging to a different group were operated or when no operable power storage system 10 exists in the different group, the management system 10 may request cooperation of the computer system installed in the power feed instruction center managing the power system. When such a request is received, the power feed instruction center severs the connection between the distribution line 4 where the disturbance is present and the power system or adjusts the output of the large-scale power station 70.

Figure 9:
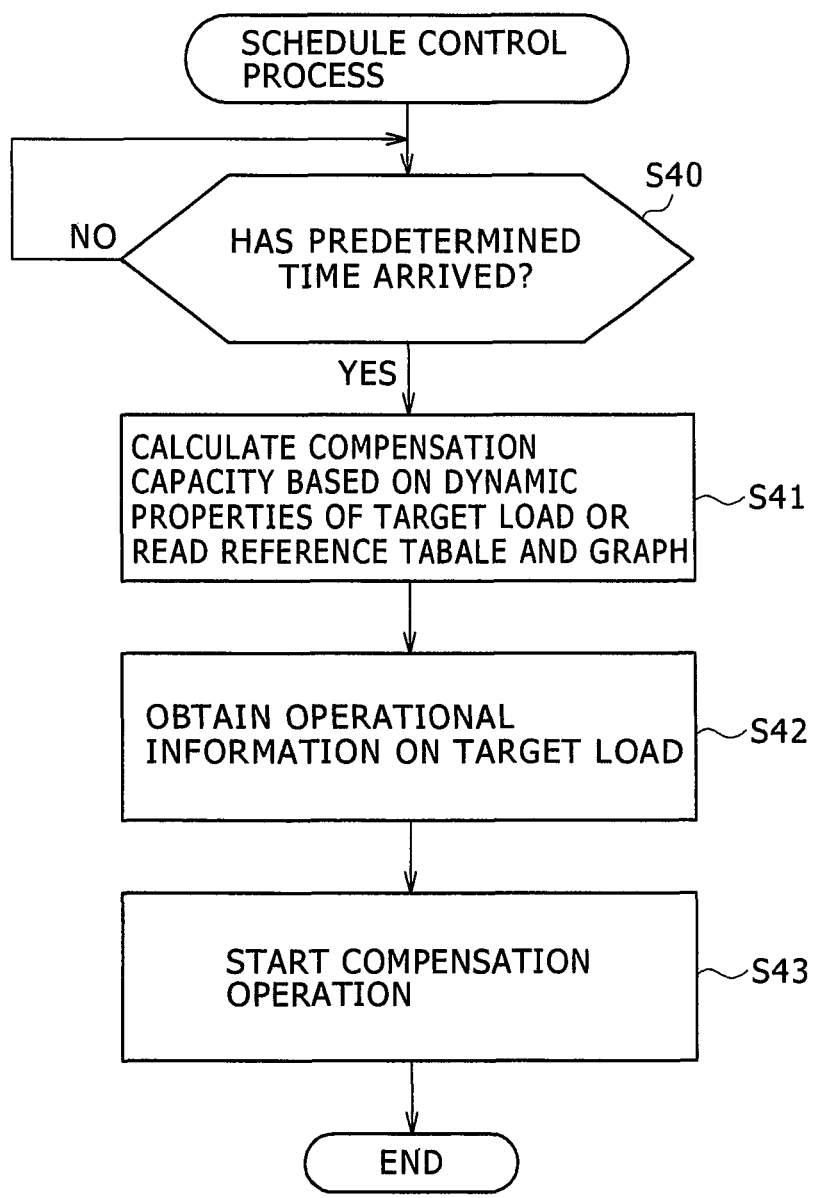
FIG. 9 is a flowchart for processing performed by a power storage system to start compensation operation according to a schedule.

FIG. 9 is a flowchart for schedule control processing. FIG. 9 will be described using the load 30 (the load 30(1) shown in FIG. 1) as an example load, information on the operating state, activated or stopped, of which can be obtained by the power storage system 10.

The power storage system 10 refers to the schedule control information T12 and determines whether a time specified in the schedule control information T12 has arrived (S40).

When a specified time has arrived (S40: YES), the power storage system 10 calculates a required compensation amount based on dynamic properties of the target load 30 and reads the corresponding preset reference data (S41). The power storage system 10 obtains operational information on the target load 30(S42).

The power storage system 10 starts a predetermined compensation operation upon detection of activation of the target load 30(S43). The power storage system 10 may start the predetermined compensation operation before activation of the target load 30. Depending on the type of the load, the power storage system 10 may be made to start the predetermined compensation operation when the target load 30 is stopped.

Even when operational information on the load 30 cannot be obtained, there are cases in which power demand variations can be predicted with a certain probability based on a power supply/demand balance history or statistical information. In such cases, too, it is possible to suppress a disturbance by making one or more power storage systems 10 operate according to the schedule control information T12.

Figure 10:
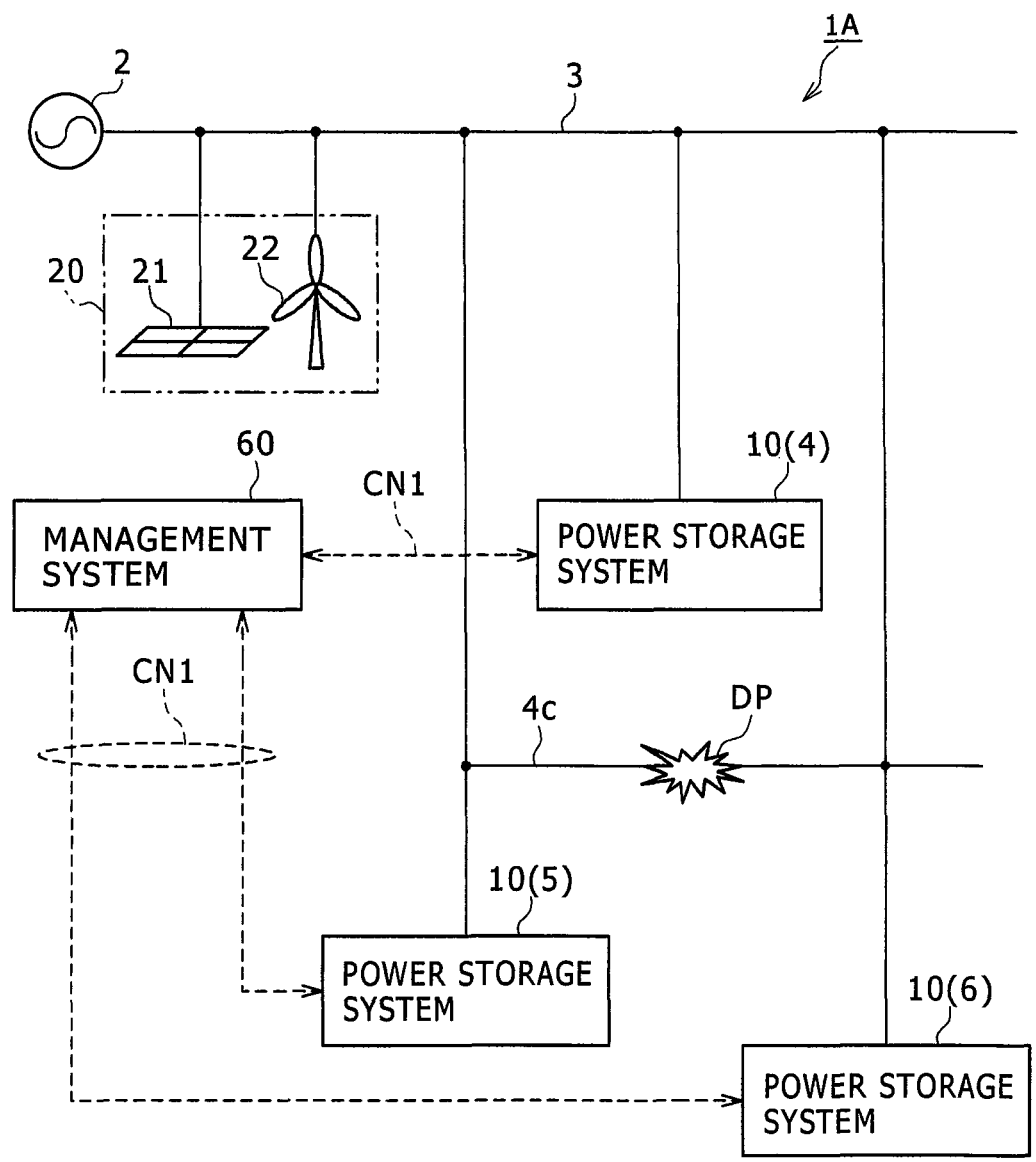
FIG. 10 is a diagram for explaining an application to a looped configuration.

FIG. 10 is a diagram for explaining how to deal with a disturbance occurring in a looped power system. Power storage systems 10(4), 10(5), and 10(6) are connected to a looped power system.

A case of a disturbance occurring in a distribution line 4c making up a part of a looped power system will be discussed. The power storage systems 10(5) and 10(6) are located as if sandwiching a disturbance DP. In other words, assume that the disturbance DP has occurred between the power storage system 10(5) and the power storage system 10(6).

When, for the disturbance DP, the power storage system 10(5) is allocated with order-of-operation no. 1 and the power storage system 10(6) is allocated with order-of-operation no. 2, the power storage system 10(5) of order-of-operation no. 1 immediately starts compensation operation. The power storage system 10(6) allocated with order-of-operation no. 2 starts compensation operation after being notified by the management system 60.

Figure 11:
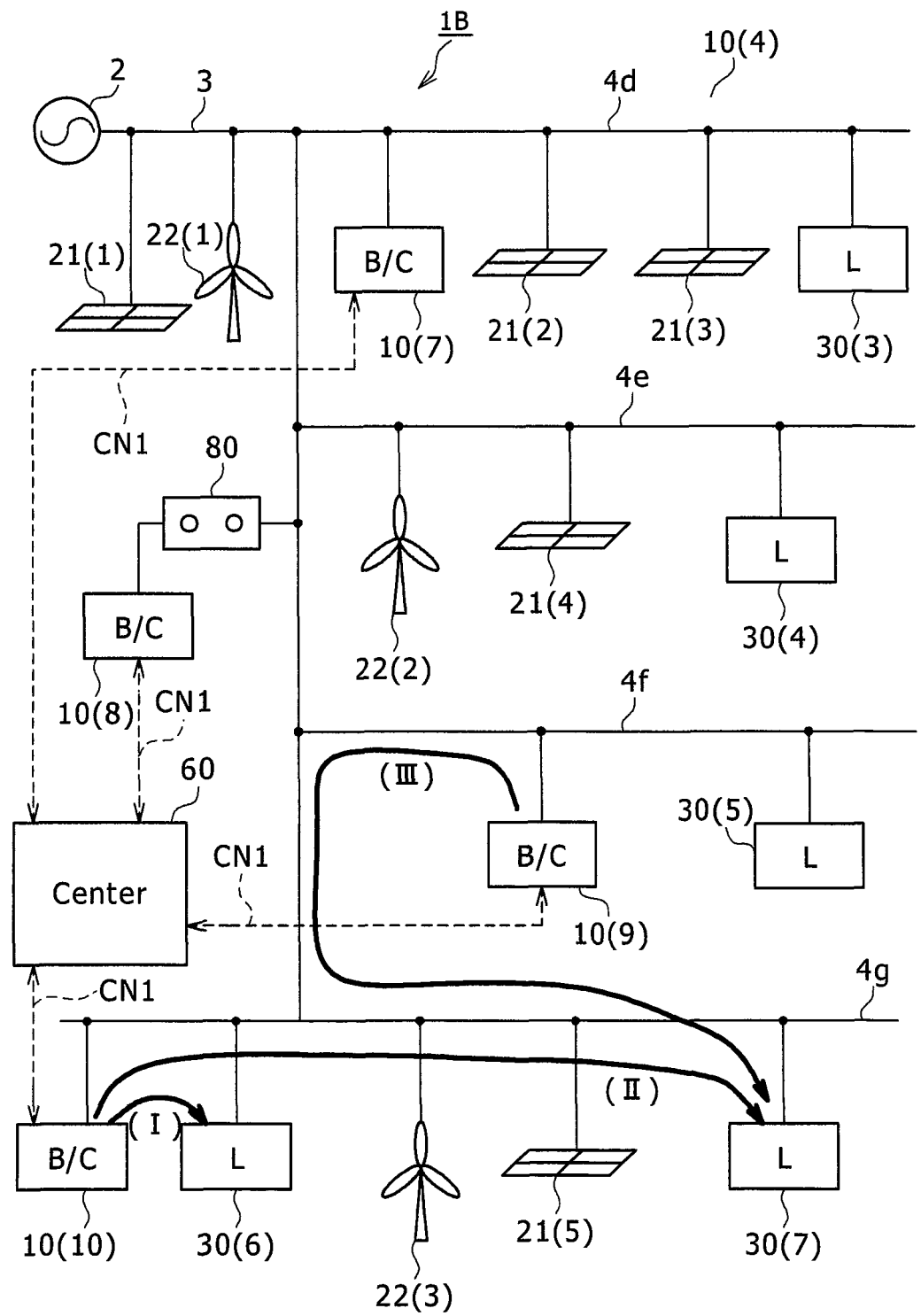
FIG. 11 is a diagram for explaining a collaborative operation by plural power storage systems.

FIG. 11 shows a power system provided with many dispersed power sources (21(1) to 21(5) and 22(1) to 22(3), many loads 30(3) to 30(7), and many power storage systems 10(7) to 10(10)).

For example, when the demand for power by the load 30(6) shown on a lower side of FIG. 11 increases, the power storage system 10(10) located closest to the load 30(6) and allocated with order-of-operation no. 1 immediately starts compensation operation as indicated by arrow (I).

A case in which the demand for power by another load, the load 30(7), has increased will be described. In such a case, the power storage system 10(10) located closest to the load 30(7) and allocated with order-of-operation no. 1 immediately starts compensation operation (discharging) as indicated by arrow (II). When the compensation operation by only the power storage system 10(10) is inadequate, the power storage system 10(9) connected to another distribution line 4f supplies power to the distribution line 4g as indicated by arrow (III).

In power exchanges between a power storage system 10 and the power system, the direction of power flow at a start of charging or discharging is uniquely determined. Hence, the phase is assumed to be set as follows.

Namely, when power is fed from a power storage system 10 to the power system (at a time of discharging), the phase of the power storage system 10 is a little advanced from the phase of the power system while maintaining a phase difference likelihood range for achieving synchronization. When power is fed from the power system to a power storage system 10 (at a time of charging), the phase of the power storage system 10 is a little delayed from the phase of the power system while maintaining the phase difference likelihood range for achieving synchronization. Adjusting the phase in this way makes it possible to achieve a control result in the direction of power feed in discharging and in charging.

A case in which a power storage system like the power storage system 10(8) shown in FIG. 11 is connected with a circuit breaker 80 on the power system side will be discussed. With an AC circuit provided at each end of the circuit breaker 80, when performing operation equivalent to "synchronous closing," the above described phase adjustment is performed. Also, incases in which, instead of the circuit breaker 80, a power conditioner controls the current flow, the above phase adjustment is performed as long as the power conditioner is provided with an AC circuit on each end side.

In the present embodiment, the power system includes plural power storage systems 10 distributed over a wide planar area. The plural power storage systems 10 perform compensation operations at their respective locations. Thus, in the present embodiment, plural small-scale power storage systems 10 respectively perform compensation operations, so that the generation of useless power flows is prevented as much as possible. To prevent the generation of useless power flows, when performing charging or discharging, the above phase adjustment is performed with the timing of closing the circuit breaker also taken into account.

In the present embodiment configured as described above, when a disturbance occurs, a power supply system 10 near the location of the disturbance starts compensation operation, so that the area affected by the disturbance can be prevented from spreading.

In the present embodiment, plural power storage systems 10 are managed in a group and, in the group, the order of operations by the power storage systems 10 is set. Therefore, in the present embodiment, the plural power storage systems 10 distributed in the power system can collaboratively stabilize the power system. Regarding the order of operations, plural power storage systems 10 may be allocated with a same order of operation. Because doing so does not cause any confusion in cause-and-effect relationship in terms of control, and it is consequently important to achieve an improved system stabilizing effect.

A procedure for achieving a compensation control effect has been described. When the system has returned to a state which can be determined as stable or is obviously returning to such a state, the control devices and the management system are required to recognize ending of the disturbance. Therefore, for such stable state recognition and ending of a disturbance, an intra-system declaration is to be made (notification of when control operation has become no longer necessary). Following such a declaration, a sequence is entered for returning each device of each power storage system into the charged state that existed prior to the starting of the control operation. This is a resetting operation to be performed in anticipation of a next request for control action. To prepare for next control action, interaction with the system is made. Therefore, if the influence of the resetting operation is too large, nothing will be achieved. Hence, charging/discharging for returning to a standby state (charging/discharging for resetting) is to be performed under quantitative control within a range where no adverse influence is generated. Particularly, when power storage systems inversely characterized in terms of an increase/decrease inclination exist in the neighborhood, it is necessary, for example, to adjust timing so as to cancel out the effects on the system of operations of such power storage systems.

In the present embodiment, when a disturbance occurs, the power storage system 10 allocated with order-of-operation no. 1 immediately starts compensation operation without waiting for any notification from the management system 60, whereas the other power storage systems 10 each start compensation operation after receiving a notification from the management system 60. Therefore, the plural power storage systems relevant to a disturbance are prevented from respectively starting compensation operation, and they orderly start compensation operation according to the order of operations predetermined for them. In this way, it is possible to prevent hunting or overshooting and to effectively stabilize the power system.

Second Embodiment

A second embodiment will be described with reference to FIG. 12. The following embodiments including the present embodiment represent example modifications of the first embodiment. The following embodiments will therefore be described centering on their differences from the first embodiment. In the present embodiment, operation mode is automatically switched according to the state of communication between the management system 60 and the power storage system 10.

Figure 12:
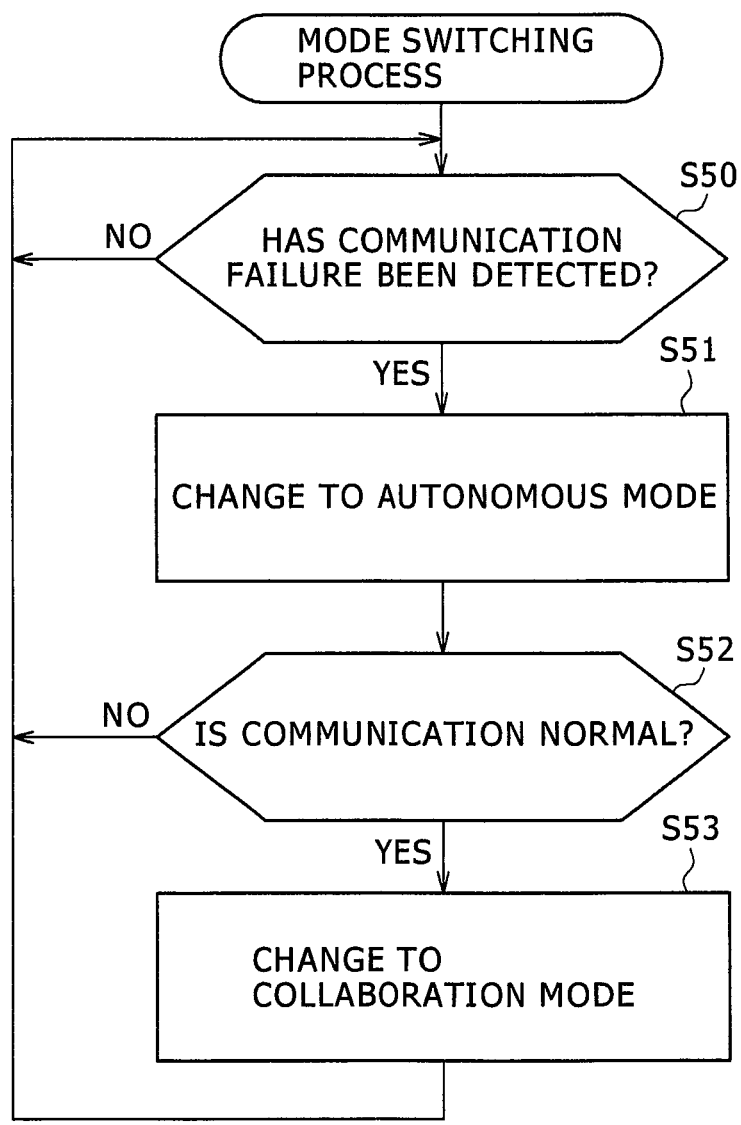
FIG. 12 is a flowchart for mode switching processing performed depending on the occurrence of a communication failure between a management system and a power storage system according to a second embodiment.

FIG. 12 is a flowchart for mode switching processing performed by a power storage system 10. The power storage system 10 is assumed to periodically communicate with the management system 60 to determine the state of communication (S50).

Upon detection of occurrence of a communication failure (S50: YES), the power storage system 10 changes to autonomous mode (S51). In autonomous mode, the power storage system 10 immediately starts compensation operation upon detection of a disturbance by the detector 40 without waiting for any notification from the management system 60. This is because of the possibility that the power storage system 10 cannot receive any notification from the management system 60 due to a communication failure between the power storage system 10 and the management system 60.

Upon detecting that the communication between the power storage system 10 and the management system 60 has returned to a normal state (S52: YES), the power storage system 10 changes to collaboration mode (S53). In collaboration mode, the power storage system 10 performs compensation operation in collaboration with the other power storage systems 10 in the group as described in detail in connection with the first embodiment.

The present embodiment configured as described above generates the same effect as the first embodiment. Furthermore, in the present embodiment, when a communication failure occurs between the power storage system 10 and the management system 60, the power storage system 10 exits collaboration mode and enters autonomous mode. In this way, it does not occur that starting of compensation operation is delayed with the power storage system 10 just waiting for a notification from the management system 60.

To prevent hunting or the like, a configuration may be used in which the capacity of compensation in autonomous mode is smaller than the capacity of compensation in collaboration mode.

Third Embodiment

A third embodiment will be described with reference to FIG. 13. The third embodiment will be described based on a case in which plural disturbances to be compensated for in different ways are detected.

Figure 13:
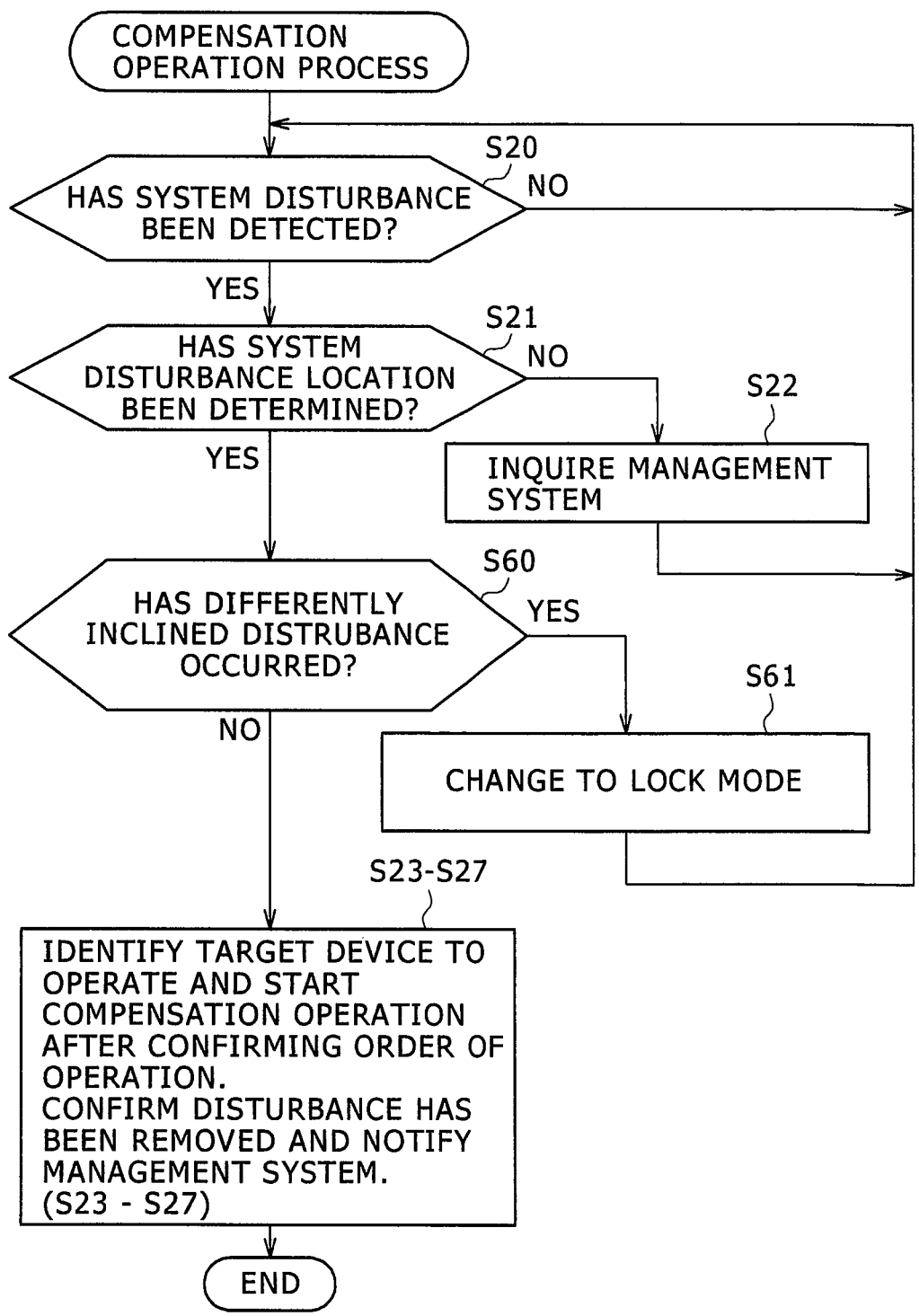
FIG. 13 is a flowchart for processing performed, when plural disturbances of different inclinations are detected, to prohibit compensation operation according to a third embodiment.

FIG. 13 is a flowchart for compensation operation processing to be performed by a power storage system 10 according to the present embodiment. This processing entirely includes the processing performed insteps S20 through S27 shown in FIG. 7. Furthermore, this processing includes additional, steps S60 and S61.

For example, after determining the location of a disturbance (S21: YES), the power storage system 10 determines whether any other disturbance of a different inclination has occurred (S60). A disturbance of a different inclination is a disturbance which differs in content from the disturbance detected in step S20 and which requires a different type of compensation operation to be performed. Assume, for example, that a disturbance has resulted from an increase in the demand for power and, as compensation operation, discharging is required. In this case, a disturbance of a different inclination may be one resulting from a decrease in the demand for power and requiring charging to be performed as compensation operation.

When, like in the above case, disturbances requiring different types of compensation operation to be performed occur at a time, the power storage system 10 changes to lock mode (S61). In lock mode, no compensation operation is performed.

The present embodiment configured as described above generates the same effect as the first embodiment. Furthermore, in the present embodiment, when differently inclined disturbances occur at a time, the power storage system 10 changes to lock mode and performs no compensation operation. In this way, neither disturbance can be suppressed, but it is at least possible to prevent either one of the disturbances from enlarging.

Fourth Embodiment

Figure 14:
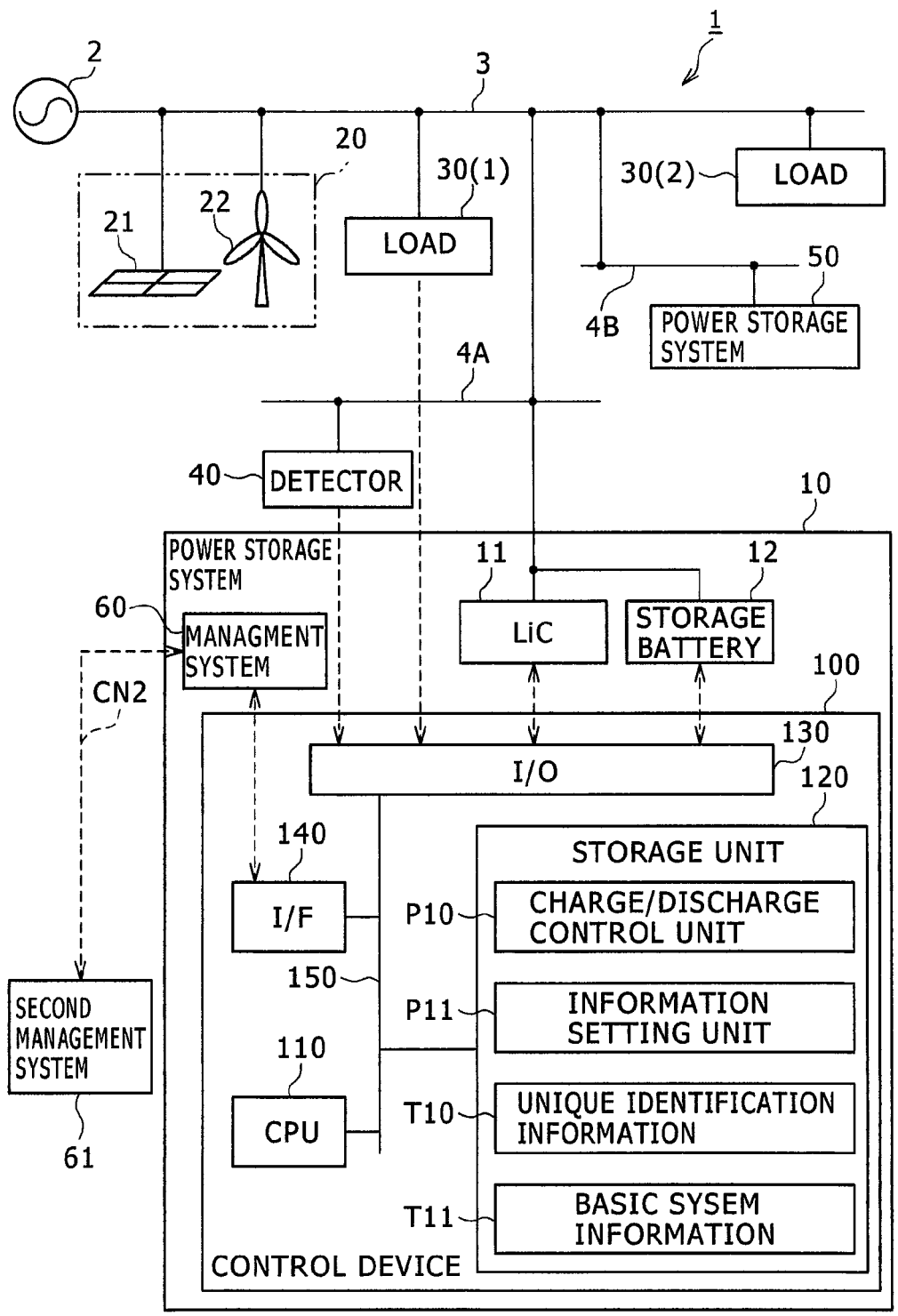
FIG. 14 shows a power system configuration including a power system stabilization system according to a fourth embodiment.

A fourth embodiment will be described with reference to FIG. 14. In the fourth embodiment, the functions of the management system 60 are provided in a specified one of plural power storage systems 10. When so instructed, the power storage system 10 having the functions of the management system 60 manages all the power storage systems 10 in the relevant district.

The power storage system 10 is connected with a second management system 61 via the communication network CN2. The manager gives predetermined instructions to a predetermined one of plural power storage systems 10 via the second management system 61. This causes the predetermined power storage system 10 to perform the functions as a management system for managing the other power storage systems 10.

The present invention is not limited to the above embodiments. One skilled in the art can add to and modify the present invention in various ways within the scope of the invention.

For example, the present invention can also be represented as an invention of a power storage system as follows.

"Representation 1

A power storage system for stabilizing a power system, comprising:

a power storage device; and a control device for controlling the power storage device, wherein the control device includes;

a storage unit for storing performance information about the power storage system, location information indicating a location in the power system of the power storage system, and order information indicating an order of operation allocated, for each disturbance location, to the power storage system; and a compensation operation control unit which performs, when a disturbance occurs in the power system, a predetermined compensation operation based on the location information and the order information.

Representation 2

The power storage system according to representation 1, being associated with a preset group, wherein the location information and the order information are shared with another power storage system belonging to the same preset group, and wherein the compensation operation control unit performs the predetermined compensation operation according to the order of operation indicated by the order information.

Representation 3

The power storage system according to representation 3, wherein the compensation operation control unit notifies the management system that the predetermined compensation operation has been performed.

The present invention can also be represented as an invention according to which power storage systems are made to operate in order of proximity to the location of a disturbance with lower orders of operations set for power storage systems located farther from the disturbance location based on the routing of power lines.

LIST OF REFERENCE SIGNS

1: Power system stabilization system, 10: Power storage system, 20: Dispersed power source, 30: Load, 40: Detector, 60: Management system.

The invention claimed is:

1. A power system stabilization system comprising:
   a plurality of power storage systems provided in the power system and
   a management system connected, via a communication network, to the plurality of power storage systems,
   wherein the plurality of power storage systems each include
      a power storage device; and
      a control device for controlling the power storage device, and
   wherein the control device includes
      a storage unit for storing performance information about the power storage system including the control device, location information indicating a location in the power system of the power storage system including the control device, and order information indicating an order of operation allocated, for each disturbance location, to the power storage system including the control device; and
      a compensation operation control unit which performs, when a disturbance occurs in the power system, a predetermined compensation operation based on the location information and the order information,
   wherein the plurality of power storage systems are grouped beforehand according to predetermined districts set for the power system,
   wherein the storage units of those power storage systems, among the plurality of power storage systems, belonging to a same group share the location information and the order information, and
   wherein the compensation operation control units of those power storage systems belonging to a same group each perform the predetermined compensation operation according to the order of operation indicated by the order information.

2. The power system stabilization system according to claim 1, wherein each of the compensation operation control units notifies the management system that the predetermined compensation operation has been performed.

3. The power system stabilization system according to claim 2, wherein, when the disturbance occurs, each of the compensation operation control units obtains, from the management system, information indicating whether or not the order of operation specified in the order information has arrived and, when the order of operation is determined to have arrived, performs the predetermined compensation operation.

4. The power system stabilization system according to claim 3,
   wherein the storage units each further store schedule information regarding an operation schedule of an electrical load connected to the power system, and
   wherein each of the compensation operation control units performs the predetermined compensation operation in accordance with the schedule information even before detection of the disturbance.

5. The power system stabilization system according to claim 3, wherein, upon occurrence of a disturbance in the power system, each of the compensation operation control units immediately performs the predetermined compensation operation when the order of operation allocated to the power storage system including the each of the compensation operation control units is no. 1 and, when the order of operation allocated to the power storage system including the each of the compensation operation control units is other than no. 1, the each of the compensation operation control units performs the predetermined compensation operation after receiving, from the management system, information indicating that the allocated order of operation has arrived.

6. The power system stabilization system according to claim 1, wherein, when a plurality of differently inclined disturbances are detected, the compensation operation control units each prohibit performing the predetermined compensation operation.

7. The power system stabilization system according to claim 1,
   wherein each of the compensation operation control units
      changes, when a failure occurs in communication with the management system, to predetermined autonomous mode and performs the predetermined compensation operation to remove the disturbance, and
      changes, when communication with the management system is recovered, from the autonomous mode to collaboration mode and performs the predetermined compensation operation in accordance with the location information and the order information.

8. The power system stabilization system according to claim 1, wherein the management system sets the location information and the order information in the storage units of the plurality of power storage systems via the communication network.

9. The power system stabilization system according to claim 1,
   wherein the storage units of the plurality of power storage systems further store effectiveness information indicating whether the predetermined compensation operation performed by each of the compensation operation control units is effective,
   wherein the management system sets the effectiveness information in the storage units of those of the plurality of power storage systems, the those of the plurality of power storage systems being operable and storing an amount of power required for the predetermined compensation operation, and
   wherein the compensation operation control unit of each of the plural power storage systems performs, only in a case where the effectiveness information indicates that the predetermined compensation operation is effective, the predetermined compensation operation upon detection of the disturbance.

10. The power system stabilization system according to claim 1, wherein the power storage device includes a capacitor which is relatively high in responsiveness and which can charge and discharge a relatively large amount of power and a storage battery which is relatively low in responsiveness and which can charge and discharge a relatively large amount of power, and
   wherein the compensation operation control units each perform the predetermined compensation operation by selecting the capacitor or the storage cell whichever is suitable for the disturbance.

11. A power system stabilization method,
wherein a plurality of power storage systems provided in the power system each include a power storage device and a control device for controlling the power storage device, the method comprising:
setting, using a management system connected to the plurality of power storage systems, performance information indicating performance of each of the plurality of power storage systems, location information indicating a location of each of the plurality of power storage systems in the power system, and order information indicating an order of operation allocated to each of the plurality of power storage systems in the control unit of each of the plurality of power storage systems,
detecting occurrence of a disturbance in the power system, and
performing, when the disturbance is detected, a predetermined compensation operation based on the location information and the order information,
wherein the plurality of power storage systems are grouped beforehand according to predetermined districts set for the power system, and
wherein the compensation operation control units of those power storage systems, among the plurality of power storage systems, belonging to a same group each perform the predetermined compensation operation according to the order of operation indicated by the order information.

12. The power system stabilization method according to claim 11, wherein the compensation operation includes, when the disturbance occurs, obtaining, from the management system, information indicating whether or not the order of operation specified in the order information has arrived and, when the order of operation is determined to have arrived, performing the predetermined compensation operation.

13. The power system stabilization method according to claim 12,
wherein the setting further includes setting schedule information regarding an operation schedule of an electrical load connected to the power system in the control device, and
wherein the compensation operation includes performing the predetermined compensation operation in accordance with the schedule information even before detection of the disturbance.

14. The power system stabilization method according to claim 11, wherein, as a concept of next-stage control following compensation control operation, recovery operation for returning to a preset reset-charged state is performed based on an upper limit setting for restricting variations of a process quantity of a voltage or frequency at a connection point for connection with the system.

15. The power system stabilization method according to claim 14,
wherein, when, regarding a state prior to the recovery operation for returning to the reset-charged state, there is an excess and a shortage with respect to a charged state in a reset state, a control target is set to balance a total amount of power charged and a total amount of power discharged for mutual offsetting.

16. The power system stabilization method according to claim 11, wherein a function of the management system is realized in a specified one of the control devices and the specified control device manages, as instructed, the plurality of power storage systems by using the function of the management system.

17. The power system stabilization method according to claim 16, wherein a predetermined instruction can be issued to specify one of the plurality of power storage systems for realizing or using the function of the management system.

18. The power system stabilization method according to claim 16, wherein a second management system is provided and the predetermined instruction is issued via the second management system.

* * * * *